:United States Patent Office 3,468,625
Patented Sept. 23, 1969

3,468,625
PREPARATION OF CRYSTALLINE ALUMINA BY HOMOGENEOUS PRECIPITATION
E. Richard Nightingale, Jr., Murray Hill, N.J., assignor to Esso Research and Engineering Company, a corporation of Delaware
No Drawing. Filed Nov. 18, 1966, Ser. No. 595,351
Int. Cl. C01f 7/30
U.S. Cl. 23—143                                            6 Claims

ABSTRACT OF THE DISCLOSURE

This is a method of producing crystalline alumina having high surface area by utilizing a homogeneous precipitation technique. A stable solution of an aluminum salt in formic acid is heated to precipitate anhydrous crystalline alumina.

---

This invention relates to the preparation of catalyst bases using homogeneous precipitation techniques and, more particularly, the preparation of large or wide pore alumina with a high surface area. These are highly desirable qualities of alumina for catalyst manufacture and for use as absorbents.

Fundamentally, this invention discloses means for the homogeneous precipitation of $Al_2O_3$ from solutions containing aluminum salts. Homogeneous precipitations are those in which physical parameters of a true solution such as temperature or pressure are altered to induce metastable solutions which approach equilibrium by the precipitation of a desired product. Homogeneous precipitations avoid the necessity of effecting precipitation by the addition of external reagents, and thereby minimize or eliminate problems of local supersaturation, nucleation, particle growth, and impurity contamination.

In this procedure precipitation of the desired product is effected by subjecting a stable solution at one temperature and pressure to differing physical conditions of temperature and/or pressure, thereby shifting the equilibrium:

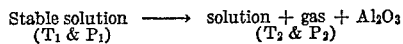

Stable solution ⟶ solution + gas + $Al_2O_3$
($T_1$ & $P_1$)         ($T_2$ & $P_2$)

It is to be noted that the primary product is not a hydrous oxide or alumina hydrogel but that a precipitate of partially hydrated crystalline alumina is formed. This product may also be described as a precipitate of crystalline alumina with some water of hydration.

Many preparations of alumina were made according to the present invention, which alumina had a minimal fraction of pore volume due to pores less than 70 A. in diameter. Preparations or formulations were made from mixtures of an aluminum salt and technical-grade or reagent-grade formic acid. Technical-grade formic acid is usually listed as of 90% concentration. Reagent-grade formic acid is required to be 88% minimum concentration, but fresh reagent-grade formic acid usually runs considerably higher. Either grade may be used in the present invention.

In the examples hereinafter given, the formic acid is used in an excess over that stoichiometrically necessary to form the aluminum formate. When it is decomposed, the excess formic acid assists in providing gas as a blowing agent to produce a porous alumina during the precipitation of the alumina.

Preferably, the preparations are made from a commercial solution of aqueous aluminum formate which analyzes about 8.5% by weight $Al_2O_3$ and about 15.3% by weight of formic acid, the remainder being water.

Variables which need to be considered include the composition of the feed, cost of the feed (minimal if commercial aluminum formate solution is used), the amount or concentration of formic acid, and the time and temperature required to precipitate the alumina.

It had been expected that it would be advantageous for the feed to contain as little free water as possible. However, the experimental work indicated that this was not necessary and that relatively dilute aqueous solutions of aluminum salts can be used with good results. Also it was expected that a tall column of oil (e.g. shot tower) should be most effective; it was however found that decomposition in a relatively shallow oil bath was equally effective. It should be noted that in the cases where the feed solution was added dropwise to an oil bath, the decomposition was complete in a matter of a few minutes, and decomposition periods greater than about ten minutes are not required at the higher temperatures.

This invention includes the preparation of a large pore alumina with a very high surface area using a formic acid medium and an aluminum compound with or without added water. The basic concept claimed is that of preparing alumina by homogeneous precipitation of an aluminum salt or compound in a liquid medium such as formic acid or one containing formic acid which, when heated, decomposes to yield alumina and a gaseous by-product (which in the case of formic acid is CO) which acts as a "blowing agent" and forms a porous alumina. The medium, above referred to as formic acid, may be any liquid which, when heated, decomposes to give gaseous products, such as $H_2O$, CO, $CO_2$, etc. The liberated gas acts as an in situ "blowing agent" which enhances the pore size and volume of the precipitated alumina during the precipitation of the alumina.

The addition of water is not essential. What is essential is to neutralize or increase the basicity of the liquid medium. One way to do this is to heat the formic acid-containing medium to decompose the formic acid to produce water vapor and CO, thus serving to reduce the acidity of the medium.

The solution of aluminum formate or aluminum compound in formic acid medium and the formic acid itself decompose at the elevated temperature of heating to form alumina as a precipitate and at the same time form gas such as CO and water vapor which act as a "blowing agent" to form a porous alumina. Instead of using a commercial solution of aqueous aluminum formate, aluminum compounds or salts which are water soluble or soluble in formic acid may be used such as, for example, basic aluminum formate [$Al(OOCH)_2OH$], aluminum nitrate, aluminum sulfate or aluminum hydroxide or mixtures thereof. Aluminum acetate, aluminum subacetate and aluminum salts of the higher fatty acids may be used where the liquid medium contains formic acid or a higher fatty acid or a mixture of such acids which are decomposable on heating during the precipitation of the alumina.

The following examples are included to show the preparation of porous high surface area aluminas formed by heating solutions of aluminum salts or compounds in a formic acid medium or solution or in an aqueous solution containing formic acid.

EXAMPLE 1

Commercial aqueous aluminum formate solution containing 8.5% $Al_2O_3$ and about 15% formic acid was added dropwise to a shallow bath (ca. 4″–6″) of hydrocarbon oil maintained at 305° F. The hydrocarbon oil was a paraffinic oil boiling above 400–450° F. The aluminum formate and formic acid decomposed and alumina was precipitated immediately with vigorous evolution of gas. After the reaction was completed (about one to five minutes), the alumina was filtered from the hydrocarbon oil and washed three times with excess n-heptane to remove traces of the hydrocarbon oil. The alumina was then calcined at 1100° F. for four hours. The calcined alumina was ground and sieved through 100 mesh, following which analyses were obtained for surface area and pore volume distribution. Results of the analyses together with the calculated "average" pore diameter are shown in Table I.

Table I

| | |
|---|---|
| Surface area _____m.$^2$/g__ | 118 |
| Total pore volume _____cc./g__ | 0.76 |
| Volume in pores <70 A. diameter _____cc./g__ | Nil |
| Average pore diameter _____A__ | 258 |

EXAMPLE 2

Commercial aluminum formate solution (as in Example 1 above) was added dropwise to a shallow bath of hydrocarbon oil maintained between 300 and 310° F. A white precipitate of alumina was formed almost immediately with a vigorous evolution of gas. Following the completion of the reaction (one to five minutes), the alumina was filtered from the hydrocarbon oil and washed three times with excess n-heptane to remove traces of the hydrocarbon oil. The alumina was calcined at 1100° F. for four hours, cooled, ground and sieved through 100 mesh. The calcined alumina was analyzed as above and the results are shown in Table II.

Table II

| | |
|---|---|
| Surface area _____m.$^2$/g__ | 150 |
| Total pore volume _____cc./g__ | 0.53 |
| Volume in pores <70 A. diameter _____cc./g__ | 0.01 |
| Average pore diameter _____A__ | 141 |

EXAMPLE 3

A solution of aluminum formate (or basic aluminum formate) was prepared by dissolving equal weights of $Al(NO_3)_3 \cdot 9H_2O$ and reagent-grade formic acid. The viscous solution formed was added dropwise to a shallow bath of hydrocarbon oil maintained at about 305° F. The precipitation of alumina required approximately one minute and was accompanied by a vigorous evolution of gas. The reaction was completed in about one to ten minutes. The alumina was then filtered from the hydrocarbon oil, washed with n-heptane (as described in Example 1 above), ground and sieved through 100 mesh and analyzed as above to give results as reported in Table III.

Table III

| | |
|---|---|
| Surface area _____m.$^2$/g__ | 81 |
| Total pore volume _____cc./g__ | 1.24 |
| Volume in pores <70 A. diameter _____cc./g__ | Nil |
| Average pore diameter _____A__ | 612 |

EXAMPLE 4

A solution of aluminum formate was prepared by adding slowly 73 grams of $Al(NO_3)_3 \cdot 9H_2O$ to 100 cc. of reagent-grade formic acid. This solution decomposed slowly with the evolution of nitric oxide ($NO_2$), but no precipitate was formed. This solution was then diluted with 100 cc. of formic acid and allowed to stand until the gas evolution ceased (2 to 24 hours). This solution was then added dropwise into a hydrocarbon oil at 145° F. At this temperature the aluminum formate decomposed slowly. (The alumina may require 5 to 30 minutes to precipitate.) After three hours the alumina was filtered from the hydrocarbon oil, then washed with n-heptane as above. The alumina was then calcined at 1100° F. for four hours, cooled, ground and sieved through 100 mesh for analysis. The alumina properties are shown in Table IV.

Table IV

| | |
|---|---|
| Surface area _____m.$^2$/g__ | 261 |
| Total pore volume _____cc./g__ | 1.62 |
| Volume in pores <70 A. diameter _____cc./g__ | 0.19 |
| Average pore diameter _____A__ | 250 |

EXAMPLE 5

A solution of aluminum formate was prepared by mixing equal weights of $Al(NO_3)_3 \cdot 9H_2O$ and technical-grade formic acid to form a viscous solution. The fresh (viscous) solution was added dropwise into the top of a 5-foot oil column maintained at a temperature of 300–310° F. The oil was the same type as in Example 1. A reservoir at the bottom of the oil column was maintained at approximately room temperature. As the solution fell through the hot oil, decomposition occurred, and alumina was precipitated with evolution of gas. The time required for the alumina to pass through the oil column and be precipitated may be less than 100 seconds (usually 30–200 seconds). The precipitated alumina was collected at the bottom of the column, filtered from the hydrocarbon oil, then washed with n-heptane as above. The alumina was then calcined at 1100° F. for four hours, ground, sieved through 100 mesh and analyzed. This alumina had a total pore volume of 1.65 cc./g. and a volume in pores <70 A. diameter of 0.03 cc./g.

EXAMPLE 6

A solution of aluminum formate was prepared by dissolving one part by weight of $Al(NO_3)_3 \cdot 9H_2O$ and four parts by weight of technical-grade formic acid. The resulting solution was maintained at its boiling temperature of about 225° F. and the incipient precipitation of alumina occurred in about 30 minutes. No hydrocarbon oil was used in this example. The solution was further boiled for an additional 90 minutes to complete the precipitation of the alumina, following which the alumina was filtered from the hydrocarbon oil and washed with n-heptane. The alumina was calcined at 1100° F. for four hours, ground, sieved through 100 mesh and analyzed as above to give the results reported in Table V.

Table V

| | |
|---|---|
| Surface area _____m.$^2$/g__ | 394 |
| Total pore volume _____cc./g__ | 1.37 |
| Volume in pores <70 A. diameter _____cc./g__ | 0.39 |
| Average pore diameter _____A__ | 139 |

The following data indicate the range of possibilities for preparing wide pore aluminas. Different samples show the following ranges in properties:

Table VI

| | |
|---|---|
| Surface area _____m.$^2$/g__ | 50–394 |
| Total pore volume _____cc./g__ | 0.33–2.53 |
| Average pore diameter _____A__ | 83–about 800 |

It is of economic significance that commercial aluminum formate solutions can be used for the preparation of aluminas and some of the best preparations have been made using such solutions.

As determined by a wide variety of samples, the preferred ratio of aluminum salt or compound to formic acid is set by the viscosity and drop-forming characteristics of the solution. For practical purposes, the weight ratio of the aluminum salt or compound to formic acid is between about 0.1:1 and not more than about 3:1. A low molecular weight aluminum compound could have a higher ratio. Stated in another way, the solution containing alumina and formic acid should contain between about 5% and about 45% of $Al_2O_3$ by weight. The mole ratio of Al to formic acid in solution should be between about 0.05 and 0.5. The amount of formic acid used is preferably in excess of that required stoichiometrically where cost is not a limiting factor. The solution may contain from 0 to about 85% by weight of water.

The invention is not to be restricted to aluminum formate made from aluminum nitrate nonahydrate and formic acid, as commercial aluminum formate and basic aluminum formate $Al(OOCH)_2OH$ may be used. Other aluminum salts or compounds may be reacted or dissolved in formic acid to form a solution. Freshly precipitated aluminum hydroxide can be dissolved in formic acid to prepare aluminum formate in formic acid solution.

The method of decomposing the solution homogeneously to precipitate the $Al_2O_3$ includes direct heating of the aqueous or non-aqueous solution of the aluminum salt or compound, the use of shot tower techniques in which the aluminum-containing solution is dropped into and passed down through a hot bath of petroleum oil or similar media, and direct methods of contacting of the aluminum-containing solution with immiscible heat sources such as oil "baths."

In the specific examples of the invention is not to be restricted to n-heptane as a wash liquid as other wash liquids which are hydrocarbon oil solvents such as benzene, cyclohexane, halogenated paraffinic solvents, and the like, may be used. Also, the invention is not to be restricted to the specific calcining temperature given for the alumina in the specific examples as the calcination temperature may be between about 700° and 1400° F. and the calcining times may be between about 0.5 and 6 hours.

In the specific examples given above, the temperature to effect precipitation of alumina is definitely described, but the invention is not to be restricted thereto, as higher or lower temperatures may be used. At the higher temperature the alumina is precipitated relatively fast, while at the lower temperature a longer time is necessary to precipitate the alumina. The temperature for precipitating the alumina from the solution may be between about 210° and 400° F., and the time of precipitation of the alumina may be between about 10 seconds and 30 minutes, the shorter times being used for the higher temperatures. In Example 4 the temperature may be as low as 145° F., and a longer time of precipitation is required.

The alumina produced according to the present invention can be used in the usual manner as a base for a variety of catalysts. It can be used as a support for platinum as a catalyst for hydroforming. It may be mixed with silica to produce silica-alumina cracking catalyst. It may be mixed with cobalt molybdate, nickel molybdate and the like for use as a hydrofining catalyst, particularly for use with high-boiling petroleum fractions such as middle distillates. It may also be used as a base for desulfurization and denitrogenation catalysts. It may further be used as an absorbent for selectively removing a gas or gases from a gaseous mixture.

What is claimed is:

1. A method of producing a crystalline alumina having a high surface area and a minimal fraction of pore volume in pores less than 70 A. in diameter which comprises the steps of
    (a) heating a homogeneous solution of an aluminum salt in formic acid, said solution containing an excess of formic acid;
    (b) precipitating an essentially unhydrated crystalline alumina while decomposing formic acid to provide a gaseous blowing agent in situ; and
    (c) recovering said alumina.

2. The method according to claim 1 in which said solution is heated to a temperature at least 145° F.

3. The method according to claim 1 in which the weight ratio of the aluminum salt to formic acid is between about 0.1:1 and 3:1 and the solution contains between about 5% and 45% of alumina by weight.

4. The method according to claim 1 in which the mole ratio of aluminum salt, calculated as Al, to formic acid is between about 0.05 and 0.5.

5. A method of producing a crystalline alumina having a high surface area and a minimal fraction of pore volume in pores less than 70 A. in diameter which comprises the steps of:
    (a) heating a homogeneous solution of aluminum formate in formic acid at a temperature in the range of 210° to 400° F., said solution containing an excess of formic acid;
    (b) precipitating an essentially unhydrated crystalline alumina while decomposing formic acid to provide a gaseous blowing agent in situ;
    (c) recovering said alumina; and
    (d) calcining said alumina.

6. The method according to claim 5 in which said aluminum formate is basic aluminum formate.

References Cited

UNITED STATES PATENTS

| | | | |
|---|---|---|---|
| 1,030,747 | 6/1912 | Quade | 260—448 |
| 2,289,286 | 7/1942 | Mazabraud | 260—448 |
| 2,371,237 | 3/1945 | Heard et al. | 252—463 X |
| 2,595,415 | 5/1952 | Schmerling | 23—141 |
| 2,595,416 | 5/1952 | Schmerling | 23—141 |

FOREIGN PATENTS 806,199   12/1958   Great Britain.

OSCAR R. VERTIZ, Primary Examiner

G. T. OZAKI, Assistant Examiner

U.S. Cl. X.R.

252—465, 466